United States Patent [19]

Metroka et al.

[11] Patent Number: 5,117,449
[45] Date of Patent: May 26, 1992

[54] DUAL RECEIVER APPARATUS FOR INTEGRATED PAGING AND RADIOTELEPHONE FUNCTIONS

[75] Inventors: Michael P. Metroka, Algonquin; Stephen V. Cahill, Palatine, both of Ill.

[73] Assignee: Motorola, Inc., Schaumburg, Ill.

[21] Appl. No.: 681,658

[22] Filed: Apr. 8, 1991

Related U.S. Application Data

[63] Continuation of Ser. No. 431,518, Nov. 3, 1989, abandoned.

[51] Int. Cl.[5] .................. H04M 11/00; G08B 5/22
[52] U.S. Cl. ........................... 379/58; 379/56; 379/57; 379/61; 379/63; 340/825.44
[58] Field of Search .................. 379/54–57, 379/58; 340/825.44

[56] References Cited

U.S. PATENT DOCUMENTS

| 3,564,150 | 2/1971 | Muller ......................... 379/58 |
| 4,392,135 | 7/1983 | Ohyagi ..................... 340/825.44 |
| 4,575,582 | 3/1986 | Makino ......................... 379/58 |
| 4,644,351 | 2/1987 | Zabarsky et al. ........... 340/825.44 |
| 4,661,972 | 4/1987 | Kai ............................. 379/57 |
| 4,677,656 | 6/1987 | Burke et al. ................... 379/63 |
| 4,747,122 | 5/1988 | Bhagat et al. .................. 379/57 |
| 4,811,379 | 3/1989 | Grandfield ..................... 379/57 |
| 4,906,989 | 3/1990 | Kasugai ..................... 340/825.44 |
| 4,940,963 | 7/1990 | Gutman et al. ................. 340/313 |
| 5,040,204 | 8/1991 | Sasuki et al. ................... 379/61 |

FOREIGN PATENT DOCUMENTS

| 0212761 | 4/1987 | European Pat. Off. . |
| 0105160 | 5/1986 | Japan ......................... 371/61 |
| 63-224422 | 9/1988 | Japan . |
| 0224422 | 9/1988 | Japan . |

OTHER PUBLICATIONS

Charlish, Geoffrey, "Designs on Pocketing the Cellular Market", Financial Times, Dec. 11, 1987.
Toshiba, Abstract of Eureopean Patent #0,263,666, Apr. 1988, Derwent Publications LTD.
Motorola, "Pageboy Tone Radio Pager", Oct. 20, 1969.
Motorola, "Dyna TAC Cellular Mobile Telephone General Description", Jun. 15, 1983, Motorola, Dyna TAC 6000X, 1984.

Primary Examiner—Thomas W. Brown
Assistant Examiner—William Cumming
Attorney, Agent, or Firm—Kenneth W. Bolvin

[57] ABSTRACT

Both paging and cellular radiotelephone functions can be combined in a small, lightweight, single device by sharing most circuitry. The apparatus can receive paging signals simultaneously with radiotelephone signals because of dual receivers (105 and 110). When the paged party receives a page, an alert tone, a vibration, a visual indication, or a voice message is used to alert the party. Information extracted from the paging signal can be stored in memory (101) for later use. The paged party can select among messages stored in memory. If a message contains a telephone number, the paged party can call that number using the radiotelephone function at the touch of a button. The apparatus's keypad (102) can be used to program the paging function receiving frequency, identification code and type of paging system.

4 Claims, 5 Drawing Sheets

DUAL RECEIVER APPARATUS FOR INTEGRATED PAGING AND RADIOTELEPHONE FUNCTIONS

This is a continuation of application Ser. No. 07/431,518, filed Nov. 3, 1989 and now abandoned.

FIELD OF THE INVENTION

The present invention relates to both the cellular radiotelephone industry and the paging industry.

BACKGROUND OF THE INVENTION

Both paging systems and cellular radiotelephone systems are widely used forms of communication. The systems allow individuals to keep in contact with the home or office while away.

The paging system is typically a one way radio communication system. An individual wishing to contact someone with a pager usually calls a central telephone number to access the central paging control. The central paging control is either automatic or operated by a human operator.

If the central paging control is automatic, the caller keys in the number assigned to the individual pager they wish to reach. Once that pager is accessed, the caller can either leave a voice message for the paged individual or key in the telephone number to be displayed on the pager's display. Some systems may also allow both types of paging.

If the central paging control is operated by a human operator, the caller typically tells the operator the number of the pager and the message. The operator then pages the individual, and relays the message when the paged individual calls the operator.

Once paged, the individual must find a telephone to answer the page. This problem can be solved by the paged individual carrying a cellular radiotelephone. The cellular radiotelephone allows a mobile user to place a call anywhere within an area covered by the cellular communications system antennas. The cellular radiotelephone allows the user to access the landline telephone system to conduct two way telephone conversations. The cellular radiotelephone user can also receive telephone calls on the radiotelephone.

The pager solves some of the problems of the cellular mobile radiotelephone system. One problem is that if the radiotelephone is turned off or the user is away from the radiotelephone when a call is made to that device, the call will be missed. Another problem is that the radiotelephone user typically pays for incoming as well as outgoing calls. If an unwanted call is made to the radiotelephone, the radiotelephone user must pay for it.

A pager allows the radiotelephone user to receive the number of the calling party whether or not he is near the radiotelephone. Additionally, the user can use the pager to screen incoming calls to determine which telephone number to call back, thereby eliminating the charges for unwanted calls.

While the pager solves some of the limitations of the cellular radiotelephone and vice versa, this creates the problem of carrying two communication devices to remain in contact while moving about an area. An example of a solution to this problem in U.S. Pat. No. 4,747,122 to Bhagat et al., assigned to Mobile Communications Corporation of America, for a mobile paging call back system. This device combines an entire radio pager and radiotelephone linked through an automatic dialer. Because of the redundant hardware and the extra automatic dialer required, this device is large and heavy and does not allow continuous availability of both paging and radiotelephone functions away from the mobile installation. There is a need therefore for a single, small, lightweight, portable device combining the advantages of both the cellular radiotelephone and the pager.

SUMMARY OF THE INVENTION

The integrated paging and radiotelephone apparatus combines paging and cellular radiotelephone functions in a single unit. The apparatus consists of dual receivers allowing reception of paging signals simultaneously with cellular radiotelephone signals.

The apparatus also consists of a transmitter for transmitting radiotelephone signals, a keypad for programming the apparatus, and a speaker and microphone for radiotelephone communication. A display indicates the functions and status of the apparatus. Additionally, shared memory is used for storing both radiotelephone data such as telephone numbers entered by the keypad and paging data such as telephone numbers received from the paging system.

The apparatus is controlled by a microprocessor. Its duties include: controlling access of the dual receivers to the radiotelephone's speaker, updating the apparatus's display, and storing data into the memory. The microprocessor also controls whether the apparatus sends an alert tone to the alert transducer to signal in incoming pager message.

The integrated paging and radiotelephone apparatus operates by alerting the user of an incoming paging message by the alert transducer tone, a voice message from the alert transducer or speaker, or an alpha-numeric message left in the display and stored in memory. The user can later scroll through the numbers stored, closed the one to be called and automatically dial the number with the radiotelephone without having to reenter the number.

In an alternate embodiment, the secondary receiver has a synthesized local oscillator. The programming bus from the oscillator is connected to the microprocessor. The user can then program paging parameters such as receiving frequency, paging identification code, and the type of paging system in which the apparatus is being used.

BEST MODE FOR CARRYING OUT THE INVENTION

Figure 1:
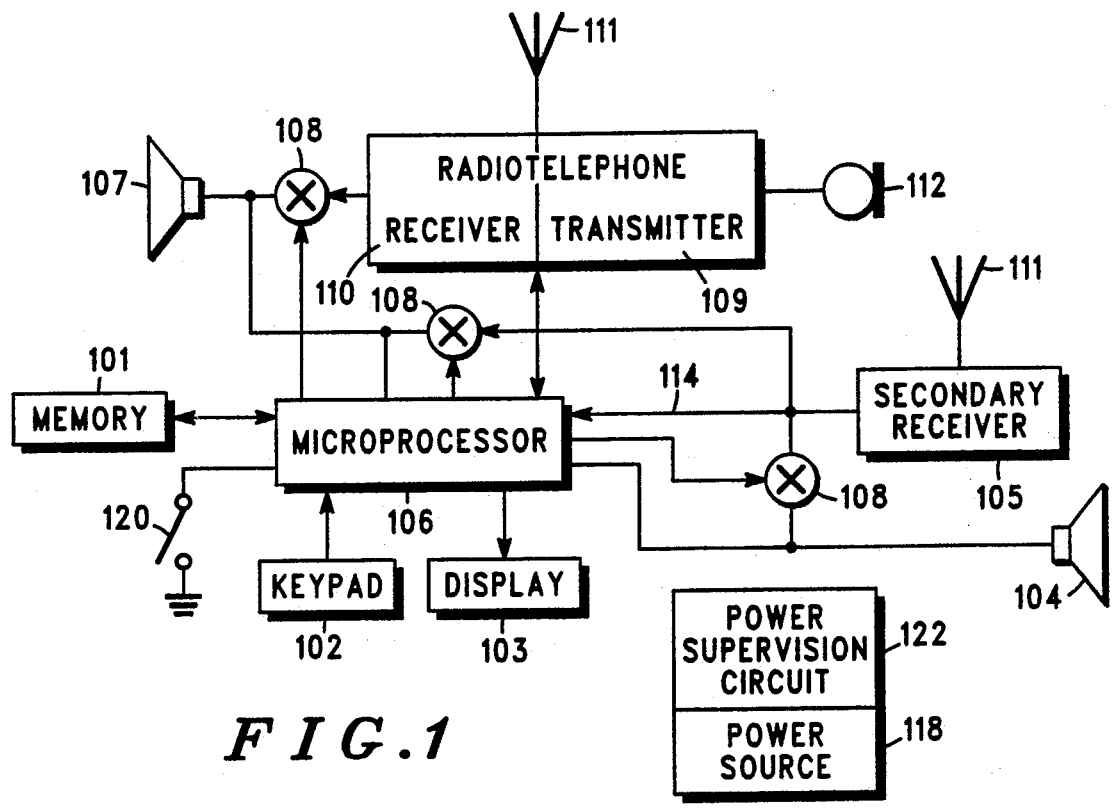
FIG. 1 shows a block diagram of the present invention.

The present invention combines radio paging and cellular radiotelephone functions in one small, lightweight unit. This is accomplished by providing a common apparatus for shared processing of paging and cellular signals received by dual receivers. Paging operations of the apparatus only requires an additional receiver (105) and antenna (111). This allows the apparatus to receive paging signals while the radiotelephone functions are in operation and alert the user with a voice message, a tone, a visual indicator, a vibrator mechanism, or an alphanumeric message that can be stored in memory for later recall. FIG. 1 shows a block diagram of a device capable of combined radiotelephone and paging functions.

The integrated paging and radiotelephone apparatus is composed of dual receivers (105 and 110), with an antenna or antennas (111), for simultaneously receiving paging signals and radiotelephone signals; one receives radiotelephone signals while the others receives paging signals. The secondary receiver (105) used to receive paging signals may have a programmable, synthesized local oscillator in an alternate embodiment.

Figure 2:
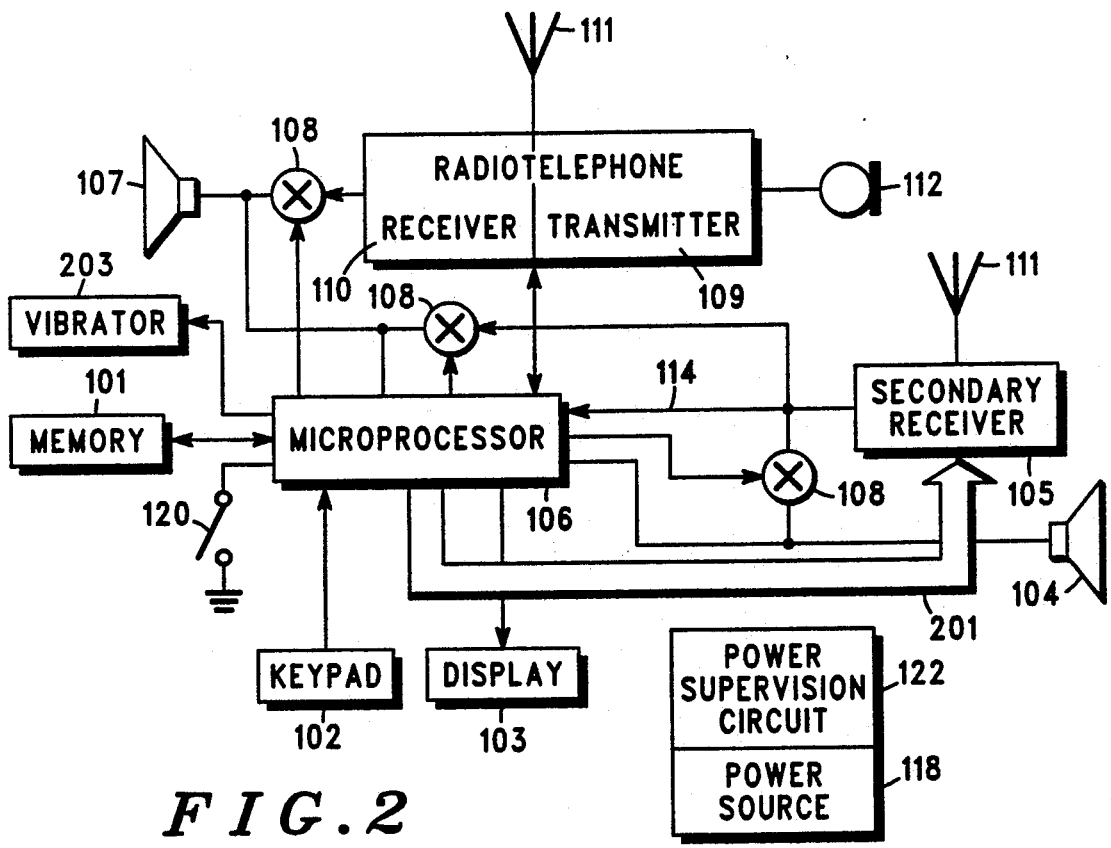
FIG. 2 shows a block diagram of an alternate embodiment of the present invention.

The receivers (105 and 110) are controlled by a microprocessor (106). The microprocessor (106) handles both the radiotelephone and the paging functions, including frequency control of the radiotelephone. It also controls whether one or both of the receivers (105 and 110) has access to the radiotelephone's speaker (107) and whether the microprocessor (106) sends an alert tone to the alert transducer (104), a message to the display (103), or allows a voice message to pass to the alert transducer (104) or speaker (107). In an alternate embodiment, as illustrated in FIG. 2, the secondary receiver (105) has a programmable local oscillator and the receiver's programming bus (201) is connected to the microprocessor (106). A vibrator mechanism (203), that is turned on by the microprocessor, can be used as an alternate alert means.

In addition, the apparatus has memory (101) which may be non-volatile shared by both the paging and radiotelephone functions, a transmitter (109) for transmission of radiotelephone signals, a power source (118), a keypad (102) for programming the apparatus, a test mode switch (120), and a display (103) for indicating the apparatus's status. A microphone (112) is used for voice transmission on the radiotelephone. Alert transducer (104) and vibrator (203) may also be used to provide an audible indication of an incoming radiotelephone call.

In operation, the secondary receiver's (195) discriminator output (114) is coupled to the microprocessor (106). The processor performs the paging algorithm on the incoming signal (U.S. Pat. No. 4,518,961 to Davis et al., assigned to Motorola, Inc., describes such an algorithm). If the paged party is on a tone only paging system, the microprocessor (106) sends a tone to the alert transducer (104) by controlling a mute gate (108), signalling a page. The microprocessor (106) may also be programmed to signal a page by an visual indicator, turning on a vibrator, or any combination of the above. If the paged party is on a display paging system, the microprocessor (106) displays the incoming data on the apparatus's display (103). If the paged party is on a voice paging system, the microprocessor (106), by controlling a mute gate (108), allows the secondary receiver (105) to send its audio to the radiotelephone's speaker (107) or to the alert transducer (104). Both radiotelephone audio and paging audio can be heard by the user simultaneously if a call is in progress at the time a page is received. The paging audio, however, cannot be heard by the party on the other side of the radiotelephone conversation.

Figure 3A:
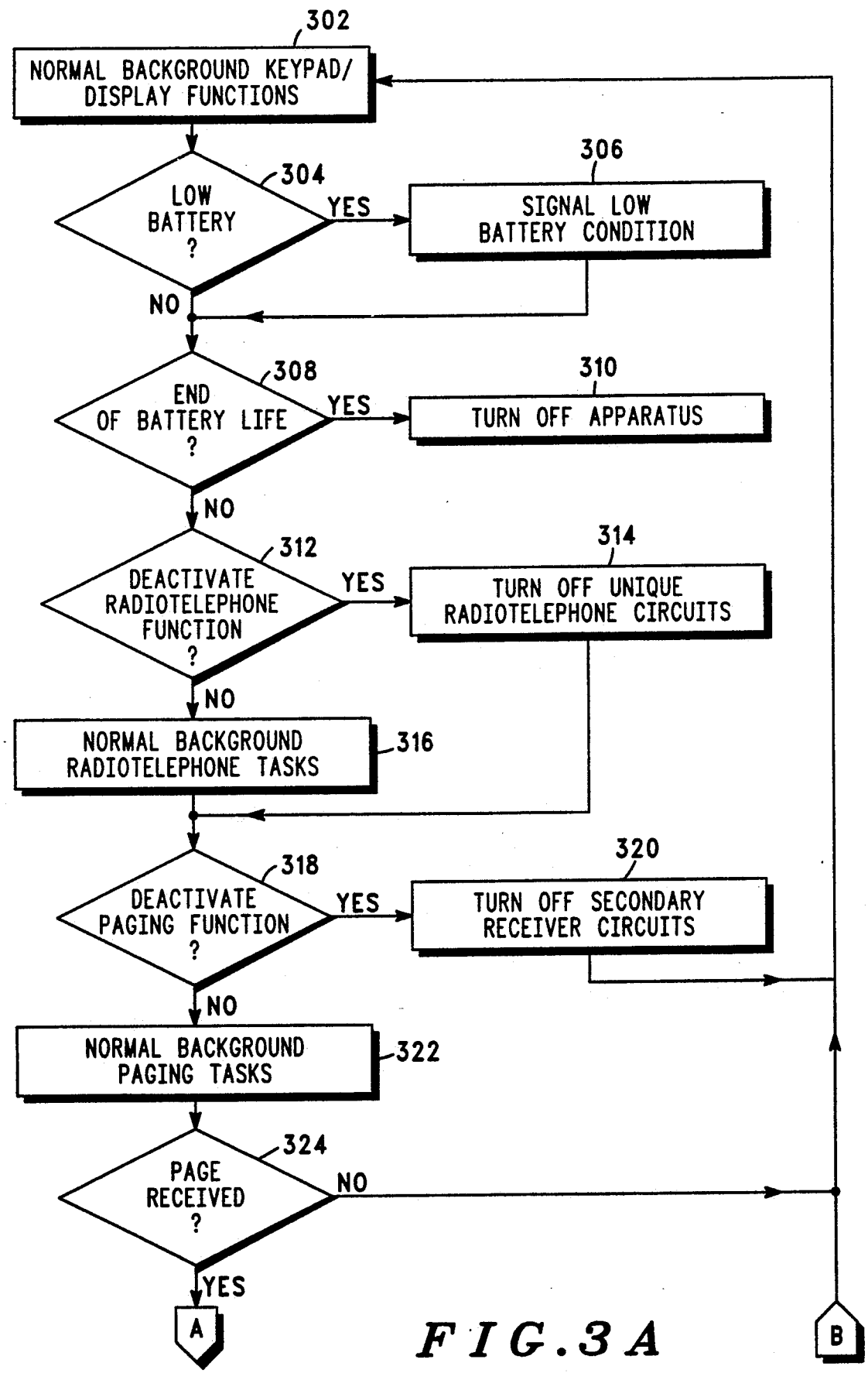
FIGS. 3A and 3B and 3C are flow charts depicting a process of combined paging and radiotelephone functions of the microprocessor which may be employed in the present invention.
Figure 3B:
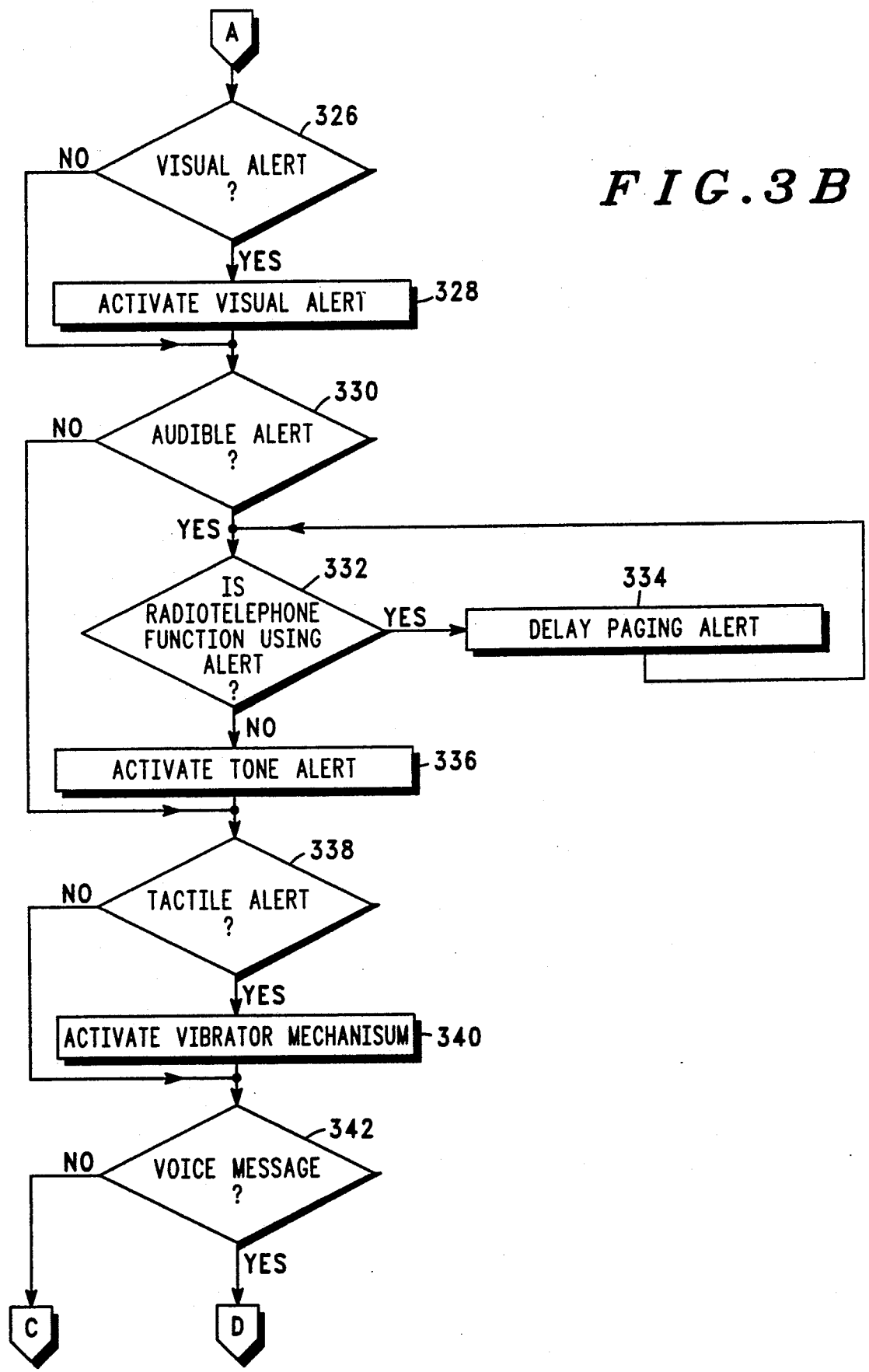
Figure 3C:
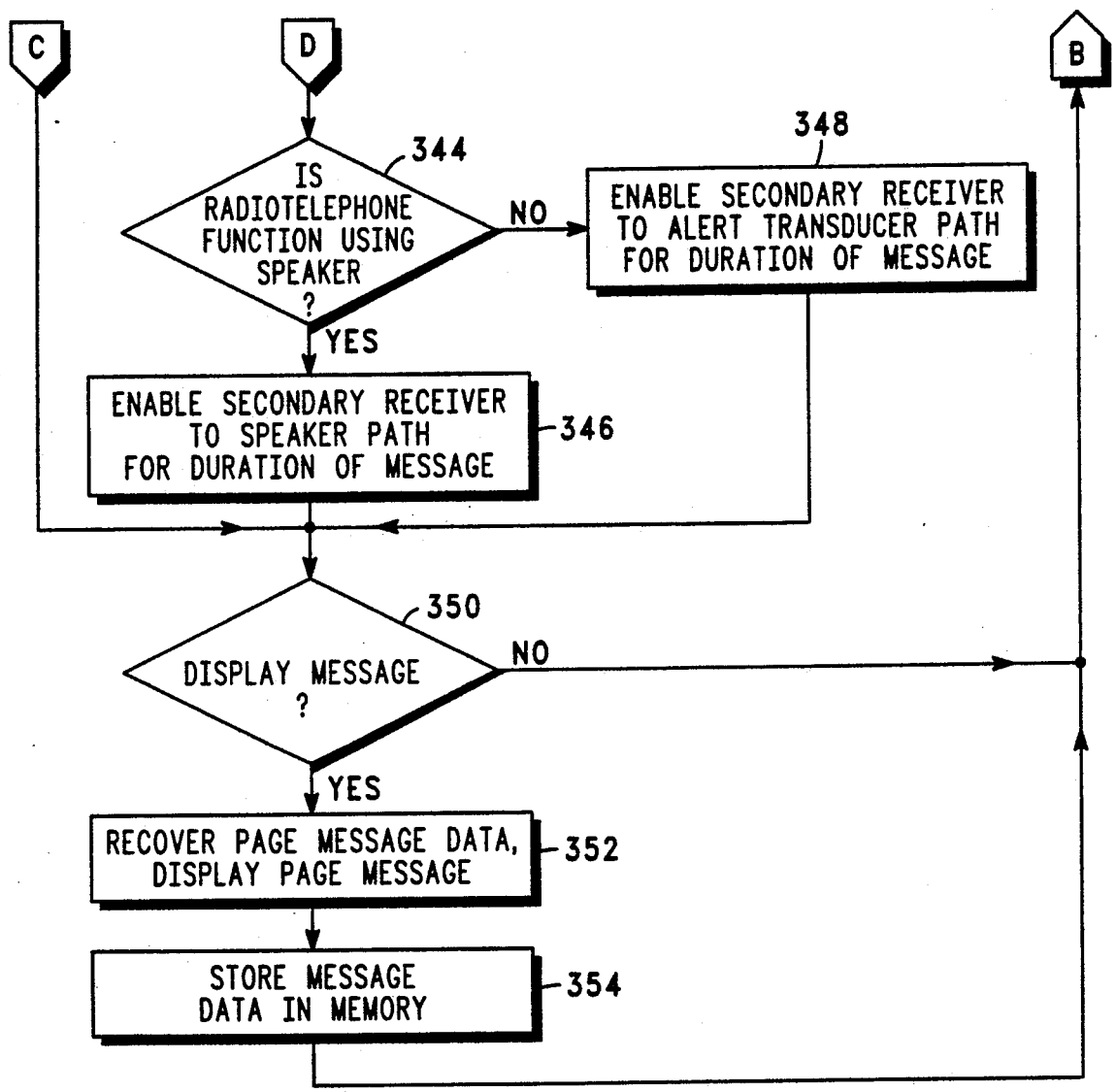

The process followed by the microprocessor (106) in realizing the present invention in the preferred embodiment is shown in FIGS. 3A, 3B and 3C. The microprocessor, as part of its routine of chores performs the necessary background tasks for the keypad and display functions (302). This entails interpreting keypad (102) input and displaying messages on the display (103).

Flow proceeds from block (302) to determination block (304) where a test is made to determine whether a low battery condition exists. If it is determined that a low battery condition does exist, then flow proceeds to block (306) where an indication is provided via a signal sent to the speaker (107) or to the alert transducer (104) or a message displayed on the display (103).

From block (306) and the "no" path of determination block (304), flow proceeds to determination block (308). At (308), a test is made to determine whether the battery has reached its end of life state. If it is determined that the battery has reached the end of life state, then flow proceeds to block (310) where the microprocessor turns the apparatus off to prevent damage to the battery. It if was determined that the battery is not at its end of life state, then flow proceeds to determination block (312). In this manner, the power supervision circuits are common to both the radiotelephone and paging functions.

At (312), a test is made to determine whether the circuits unique to the radiotelephone functions should be turned off. If it is determined that the radiotelephone functions should be turned off, then flow proceeds to block (314) where power to the circuits is disabled to conserve battery drain. From block (314), flow proceeds to determination block (318). If it is determined that the radiotelephone functions are not to be disabled, then flow proceeds from determination block (312) to block (316) where normal radiotelephone background functions are performed. Normal radiotelephone background functions include but are not limited to receiving and answering incoming telephone calls, alerting the user of incoming calls, initiating outgoing telephone calls, storing telephone numbers in memory (101), for future use, and recalling telephone numbers from memory (101) to place calls.

From block (316) and block (314), flow proceeds to determination block (318) where a test is made to determine if the paging function should be deactivated. If it is determined that the paging functions are to be deactivated, then flow proceeds to block (320) where the power to the secondary receiver is deactivated to save battery drain. Flow proceeds from block (320) to block (302) to resume the normal keypad/display background functions. In this manner, the paging functions can be deactivated independently of the radiotelephone functions and vice versa. This allows the user to receive pages and respond with the radiotelephone functions at a later time. Also, the user can use the radiotelephone functions without the paging functions drawing power.

If it is determined that the paging functions are not to be deactivated, flow proceeds from (318) to block (322) where the microprocessor performs the normal paging background functions. The paging background functions include but are not limited to monitoring the discriminator output from the secondary receiver (105) to detect an incoming page from a paging system. From block (322), flow proceeds to determination block (324) where a test is made to determine whether a page has been received. It it is determined that a page has not been received, then flow proceeds from block (324) to block (302) to resume the normal keypad/display background functions. If it is determined that a page has been received, then flow proceeds from determination block (324) to determination block (326).

At (326), a test is made to determine whether a visual alert should be initiated. It if is determined that a visual alert is to be initiated, then flow proceeds to block (328) where the visual alert is generated. This visual alert may be but not limited to the turning on of a light, the flashing of a light, or a message being sent to the display (103). Flow proceeds from block (328) to determination block (330). If it is determined that a visual alert is not to be initiated, then flow proceeds from determination block (326) to determination block (330).

At determination block (330), a test is made to determine whether a tone alert should be initiated. If it is determined that a tone alert is to be initiated, then flow proceeds from (330) to determination block (332) where a test is made to determine whether the radiotelephone functions are presently using the alert transducer. If it is determined that the radiotelephone functions are using the alert transducer, then flow proceeds to block (334) where a delay time is allowed to pass before flow proceeds back to determination block (332). In this manner, both the radiotelephone functions and the paging functions are able to share a common alert transducer (104).

If it is determined that the radiotelephone functions are not presently using the alert transducer, then flow proceeds from determination block (332) to block (336) where an audible alert signal generated by microprocessor (106) is sent to alert transducer (104). This audible alert signal may, but is not limited to, a single tone, a series of short bursts of a tone, or multiple tones. Flow proceeds from block (336) to determination block (338). If it is determined that an audible alert is not to be initiated, then flow proceeds from determination block (330) to determination block (338).

At (338), a test is made to determine whether a tactile alert is to be initiated. This tactile alert may be generated by turning on an electromechanical vibrator device. If it is determined that a tactile alert is to be initiated, then flow proceeds to block (340) where a vibrator mechanism is activated. From block (340), flow proceeds to determination block (342). If it is determined that a tactile alert is not to be initiated, then flow proceeds from (338) to determination block (342).

At (342), a test is made to determine whether a voice message is being received by the paging functions. If it is determined that a voice message is not be received, then flow proceeds from (342) to determination block (350). If it is determined that a voice message is being received, then flow proceeds to determination block (344) where a test is made to determine whether the radiotelephone functions are using speaker (107). If it is determined that the speaker is being used by the radiotelephone functions, then flow proceeds to block (346) where the speaker path from the secondary receiver to speaker (107) is enabled for the duration of the voice message. In this manner, speaker (107) can be accessed by both the radiotelephone function and the paging function simultaneously.

Flow proceeds from (346) to determination block (350). If it is determined that the radiotelephone functions are not using speaker (107), then flow from block (344) proceeds to block (348) where the audio path from the secondary receiver is routed to alert transducer (104) for the duration of the voice message. From block (348), flow proceeds to determination block (350).

At (350), a test is made to determine whether a display message is being received by the paging functions.

If it is determined that a display message is not being received by the paging functions, then flow returns to block (302) where the normal keypad/display background functions are performed. If it is determined that a display message is being received by the paging functions, then flow proceeds to block (352) where the message is recovered from the paging signal and displayed on display (103).

From (352), flow proceeds to block (354) where the received display message is stored in memory (101) for future use. This future use may be to review received paging messages and return a call using a stored paging message containing a telephone number. In this manner, the memory (101) is shared by both the paging functions and the radiotelephone functions. From (354), flow returns to block (302) where the normal keypad/display background functions are performed.

Messages can be stored in memory (101) until the user decides to erase them. This allows the user to accumulate a quantity of messages for recall at a later time. Therefore, if the user is too busy to answer a page immediately, the messages can be saved for later use. At that time, the user can recall the list of messages in memory (101), displaying them on the apparatus's display, then scroll through the messages using the apparatus's keypad (102) until the one needed is found. After displaying the message, if the message contains a telephone number, the user touches the apparatus's SEND button on the keypad. This allows the user to place the call without having to reenter the number.

The apparatus performs the cellular radiotelephone function in a conventional manner. The keypad (102) is used to enter a telephone number that is displayed on the display (103). This number can be used immediately or stored with other numbers in memory (101) for later use. Once the number is entered or recalled from memory (101), the user touches the SEND button to place the call. An incoming call is announced by a tone on the alert transducer (104). The user touches the SEND button to answer the call.

In addition to entering telephone numbers, the keypad (102) can be used to program various functions of the apparatus. If the secondary receiver (105) has a programmable, synthesized local oscillator, as in the alternate embodiment illustrated in FIG. 2, the keypad (102) can be used to program it via the microprocessor (106) and synthesizer programming bus (201). In this way, the user can change the receiving frequency of the secondary receiver (105). Other paging parameters are also programmable without the the synthesizer programming bus (201). These parameters can include the paging identification code, the type of paging system in which the apparatus will be operated (i.e., tone only, tone/voice, or display), and the alert mode (i.e., beeper, vibrator, visual indicator, no alert, or any combination). Programmability of the paging control functions permits operation of the apparatus on paging systems with incompatible signaling characteristics and user control of the alert mode. The paging parameters are stored in memory (101).

The keypad (102) can also program radiotelephone parameters. These parameters include, but are not limited to, the system identification number and the user's telephone number. The radiotelephone parameters are stored in memory (101).

Figure 4:
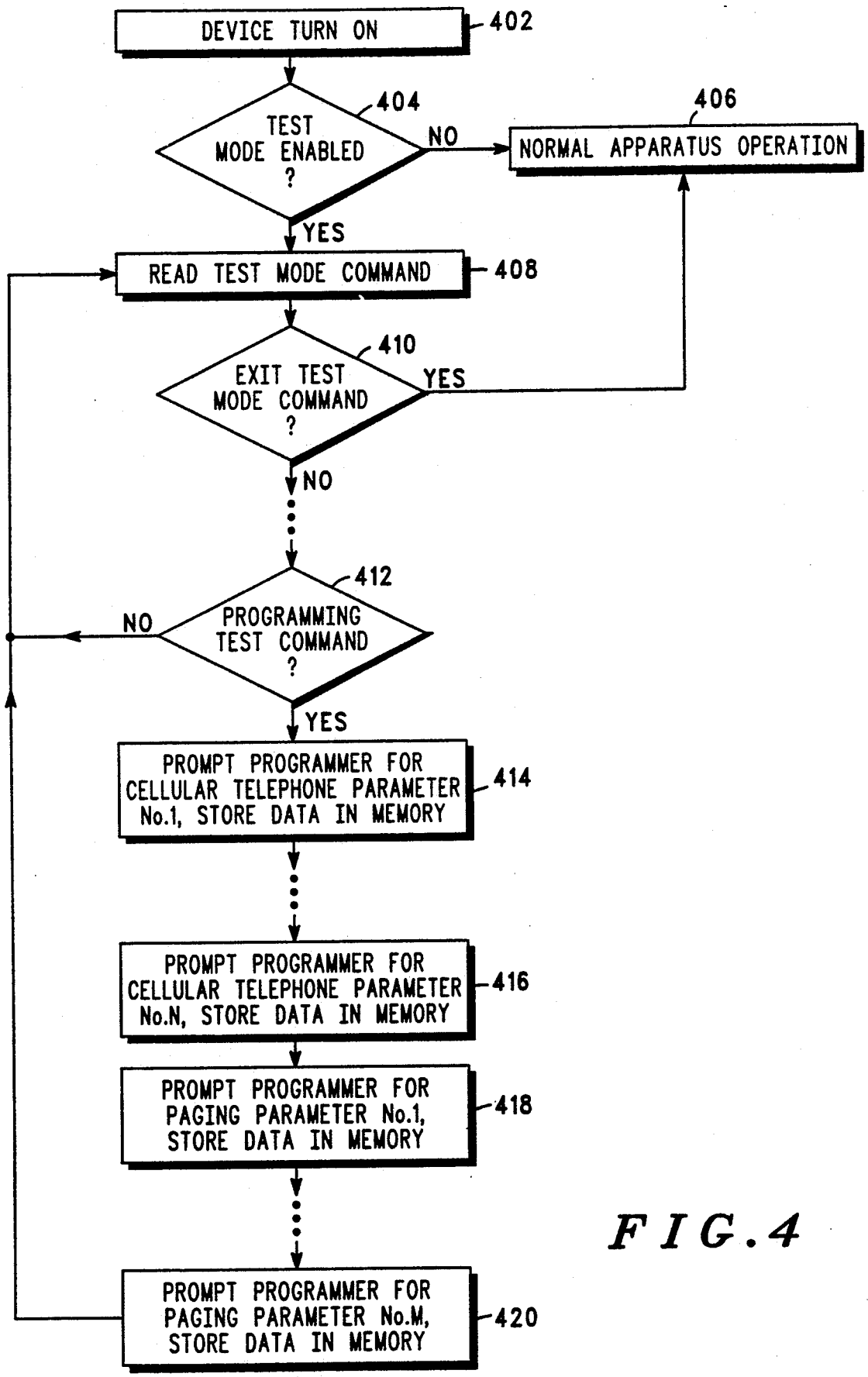
FIG. 4 is a flow chart depicting a process of programming radiotelephone and paging parameters which may be employed in the present invention.

The programming process followed by the microprocessor (106) in realizing the present invention in the alternate embodiment is shown in FIG. 4. Upon turn on of the device (402), the microprocessor (106), as part of its routine of chores, makes a test (404) to determine whether a test mode is to be entered. This is signalled by a low level into to the microprocessor (106) from a test mode switch (120). The test mode is used, among other things, to program the operating parameters of the device. If it is determined that the test mode is not to be entered (404), then flow proceeds to block (406) for normal apparatus operation. If it is determined that the test mode is desired (404), then flow proceeds from (404) to block (408) where the microprocessor (106) reads a test mode command input by the user via the keypad (102).

From (408), flow proceeds to determination block (410) where a test is made to determine whether to exit the test mode routine. If it is determined that the test mode is to be exited, then flow proceeds to block (406) where normal device operation is enabled. If it is determined that the test mode is not to be exited, then flow proceeds through a series of test command determination blocks of which block (412) is one.

At determination block (412), a test is made to determine whether the programming command was input at block (408). If it is determined that the programming command was not input, then flow proceeds to block (408) where the microprocessor (106) waits for a test command to be input. If it is determined that the programming command was input, then flow proceeds from (412) to block (414) where a prompt is displayed on the display (103) asking the user to input the first of a series of programmable radiotelephone parameters via the keypad (102).

Flow continues to block (416) where the $n^{th}$ radiotelephone parameter is programmed. From block (416), flow proceeds to block (418) where a prompt is displayed on the display (103) asking the user to input the first of a series of programmable paging parameters via the keypad (102).

Flow continues to block (420) where the last paging parameter is programmed and stored in memory (101). From (420), flow proceeds to block (408) where the microprocessor (106) waits for a test command to be input. In this manner, both radiotelephone and paging parameters are programmed via the keypad (102).

The integrated paging and radiotelephone apparatus's power source may be an automobile's electrical system or a battery. If a battery is used, the apparatus uses a power supervision circuit (122) to monitor the battery's condition. The procedure outlined above is used to monitor the battery's condition.

The integrated paging and radiotelephone apparatus described gives the user the function of both a pager and a cellular radiotelephone without carrying two devices. The apparatus allows incoming pages to be heard, felt, or displayed and can store the telephone numbers received on the paging channel for later use. In addition, the apparatus's paging parameters and radiotelephone parameters may be programmed through the keypad.

Those skilled in the art will recognize that various modifications and changes could be made to the invention without departing from the spirit and scope thereof. It should therefore be understood that the claims are not to be considered as being limited to the precise embodiments set forth in the absence of specific limitations directed to such embodiments.

We claim:

1. An integrated paging and radiotelephone apparatus with integral keypad for entering data, comprising:
    a) first receiving means for receiving radiotelephone signals;
    b) second receiving means for receiving paging signals;
    c) transmission means for transmitting radiotelephone signals;
    d) electro-audio transducer means, coupled to the first and the second receiving means, for generating an indication in response to the radiotelephone signals or the paging signals, the electro-audio transducer coupled to the first receiving means through first controllable gating means and the second receiving means by second controllable gating means;
    e) a shared memory for storing data from the integral keypad and the received paging signals;
    f) a processor, directly connected to the first receiving means, the second receiving means, the transmission means, and the first and second controllable gating means, for producing radiotelephone control signals and controlling the first and second controllable gating means;
    g) first indicating means for displaying information corresponding to the received paging signals and the radiotelephone control signals; and
    h) second indicating means for announcing the received paging signals and the received radiotelephone signals.

2. The apparatus of claim 1 wherein the second indicating means is vibrating means.

3. The apparatus of claim 1 and further including antenna means coupled to the first receiving means, the second receiving means, and the transmission means.

4. An integrated paging and radiotelephone apparatus comprising:
    a) first receiving means for receiving radiotelephone signals;
    b) second receiving means for receiving paging signals;
    c) transmission means for transmitting radiotelephone signals;
    d) electro-audio transducer means, coupled to the first and the second receiving means, for generating an indication in response to the radiotelephone signals or the paging signals, the electro-audio transducer coupled to the first receiving means through first controllable gating means and the second receiving means by second controllable gating means; and
    e) a processor, directly connected to the first receiving means, the second receiving means, the transmission means, and the first and second controllable gating means, for producing radiotelephone control signals and controlling the first and second controllable gating means.

* * * * *